United States Patent [19]
Podvin

[11] 3,850,716
[45] Nov. 26, 1974

[54] FLAME SEALING METHOD
[75] Inventor: Richard T. Podvin, Minneapolis, Minn.
[73] Assignee: RPR Industries, Inc., Minneapolis, Minn.
[22] Filed: Dec. 20, 1973
[21] Appl. No.: 426,500

Related U.S. Application Data
[63] Continuation of Ser. No. 214,327, Dec. 30, 1971, abandoned.

[52] U.S. Cl. .................. 156/82, 156/164, 156/199, 156/258, 156/497
[51] Int. Cl. ............................................ B32b 31/26
[58] Field of Search ............ 156/82, 163, 164, 199, 156/202, 203, 204, 217, 218, 250, 256, 258, 259, 271, 499, 497; 270/41, 86, 93; 53/28, 29, 39, 44, 46, 180, 373

[56] References Cited
UNITED STATES PATENTS
2,488,212   11/1949   Lloyd, Jr. ............................... 156/82
2,979,113   4/1961   Stageberg ........................ 156/499
3,408,242   10/1968   Rochla .............................. 156/82
3,678,812   7/1972   Wech ................................. 93/20

*Primary Examiner*—Douglas J. Drummond
*Assistant Examiner*—F. Frisenda, Jr.

[57] ABSTRACT

An apparatus and method for flame sealing heat-sealable sheet material, as polyester film. The sheet material is center-folded and moves under substantially constant tension in an elongated path. During movement of the folded sheet material in the elongated path, a knife trimmer cuts linear aligned edges on superimposed portions of the sheet material. The aligned edges are flame sealed with an elongated flame unit. A linear portion of the sheet material adjacent and substantially parallel to the edges being heat sealed is cooled to confine the heat to the edges. The heat sealed edges are then cooled in an elongated chamber. A pair of puller rollers act on the sheet material to continuously move the sheet material under tension in the elongated path.

20 Claims, 15 Drawing Figures

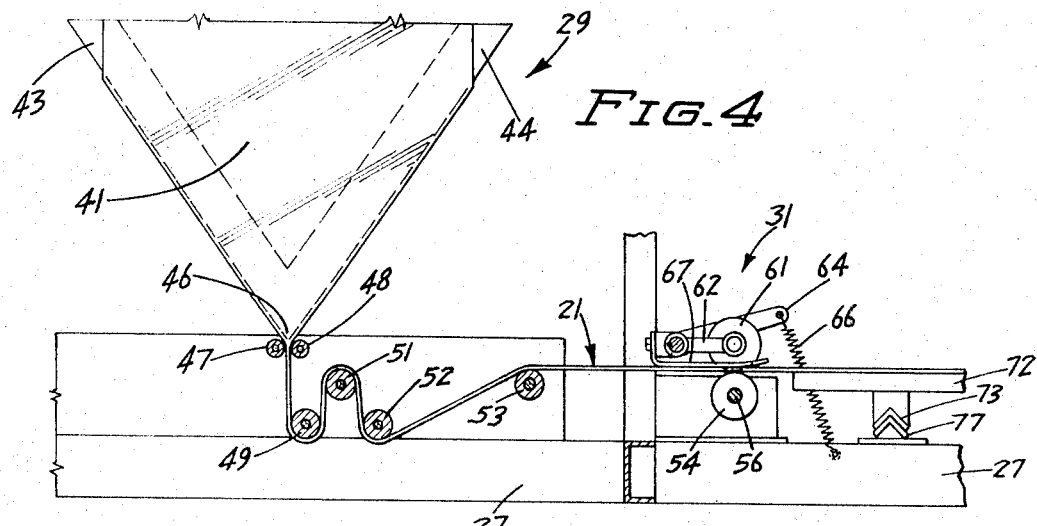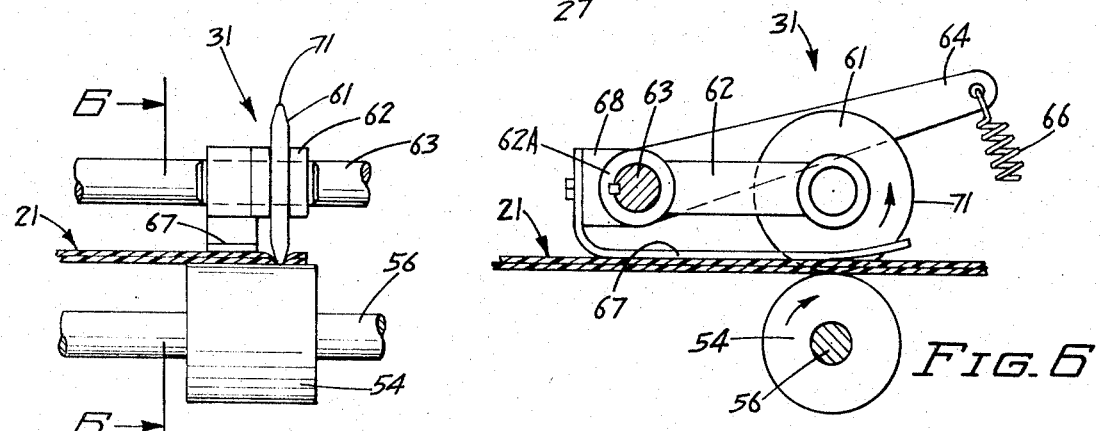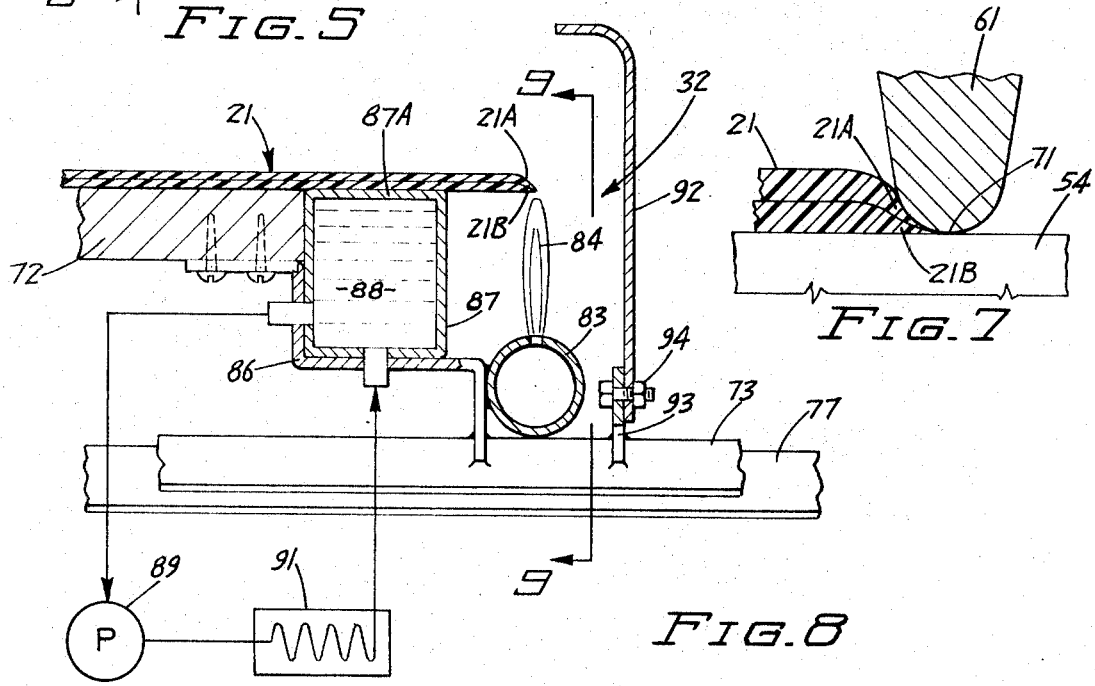

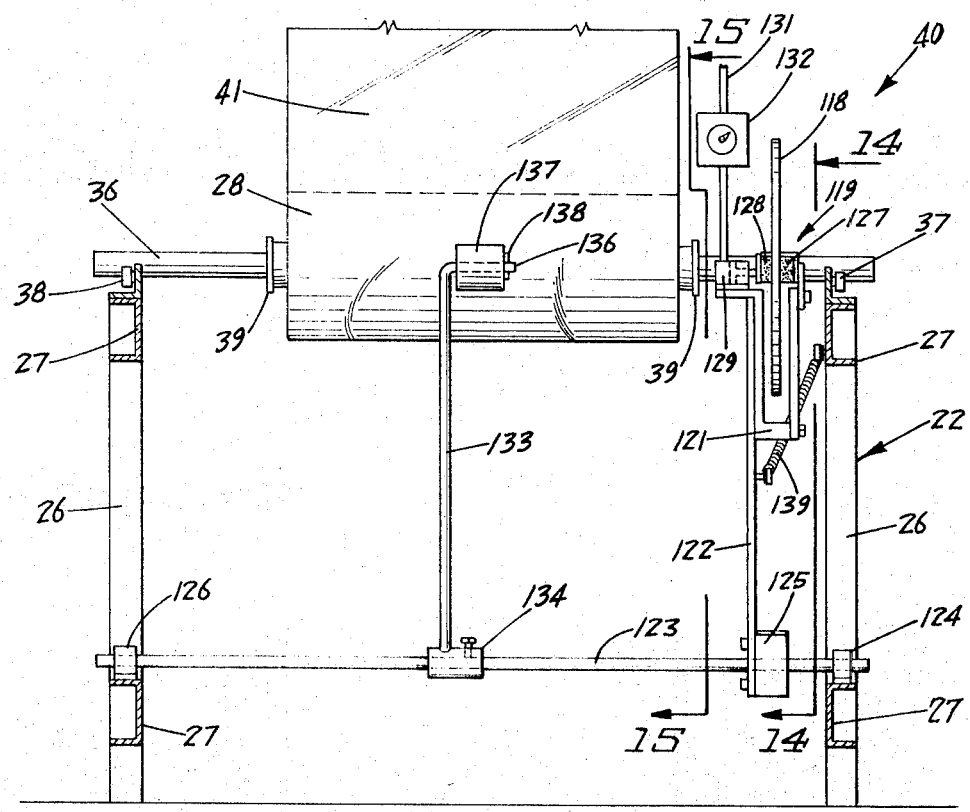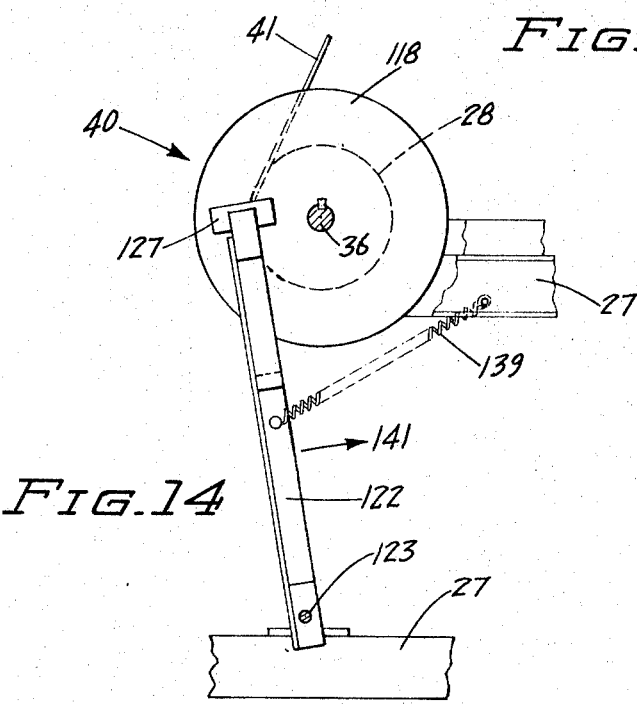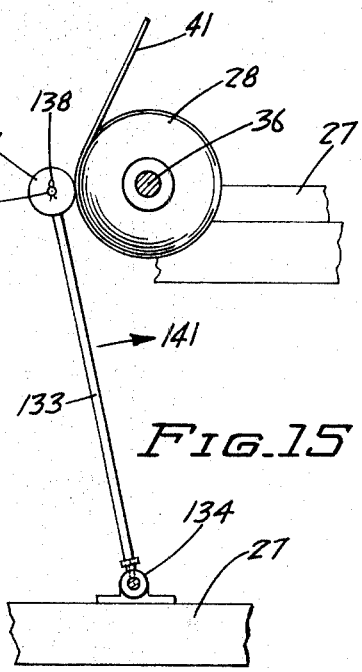

FLAME SEALING METHOD

This is continuation of application Ser. No. 214,327 filed Dec. 30, 1971 now abandoned.

BACKGROUND OF INVENTION

Numerous machines and heat sealing methods have been used to fuse or heat seal plastic sheet material. Flame heat sealing operations produce continuous heat sealed joints in a wide range of films used in the packaging industry.

Bergstein discloses in U.S. Pat. Nos. 2,676,642 and 2,678,679 a heat sealing device for continuously sealing polyethylene film. The devices have endless moving belts which serve as heat conducting elements and shielding members. Heat in the form of a flame is applied to a single area and a narrow portion of the belts whereby heat is transmitted through the belts to heat seal the film.

Stageberg in U.S. Pat. No. 2,979,113 shows another heat sealing apparatus which uses a sharp knife to form an edge on superimposed layers of heat-sealable material and an elongated heater element to form the heat seal along the edge. The heater element is disposed at an angle inward relative to the direction of movement of said edge whereby the heat seal bead progressively increases in size. In these heat sealing processes the seals are weak as the sealed area has lost most of its molecular orientation achieved during extrusion. These processes do not subject the heated portion of the film to tenison during the heat seal operation and during the time the heat seal is cooled. Also, there is no control of the temperature of the film immediately adjacent the edge of the film being heated.

Pommer in U.S. Pat. No. 3,066,064 has increased the thickness of a heat seal joint by first sealing a band section of film together inwardly from the edges of the film with heated bars. The entire seal and edges are subsequently subjected to a flame so that the edges melt and fuse with the seal. This increases the size of the seal.

Polyester films have two desirable properties, low permeability to gases and high strnegth, that justify their use in several types of specialized packaging. A shrinkable grade of polyester film is used in the United States and Europe to shrink package hams and turkeys. Uses of heat set polyester films are limted since these films cannot be readily sealed by heat or high frequency methods. However, when coated with or laminated to a heat sealable polymer, as polyethylene, polyester films find extensive use in boil-in-bag pouches and for packaging such diverse foodstuffs as coffee, shrimp and sauces.

Polyester films used for packaging are made from a polymer of terephthalic acid and ethylene glycol. The packaging films are biaxialy oriented to produce a sheet having approximately balanced uniform properties in both machine and transverse directions. Polyester films from resins of differing chemical and molecular structures are manufactured by several companies in the United States; "Mylar" polyester film by Dupont, "Scotchpak" and "Scotchpar" polyester films by 3M Company and "Celanar" polyester film by Celanese Company are examples. "Scotchpak" polyester film has been converted into boil-in-bag pouches for a variety of frozen foods. It has also been used for a thaw-in-bag pouch for frozen fruits. Modified polyester film has been used as roast-in-bag and bake-in-bag packages for cooking foods in institutional and home ovens. The film transmits radiant heat so that meat in the bag will brown in the normal fashion while the bag retains the flavors and juices and provides a juicier, more flavorful food. The film is stable throughout the normal oven bake cycles and are approved for direct contact with foods at these temperatures. These films are also used for packaging sutures and other sterilized medical products.

Polyester films are relatively flame resistant and have high sealing temperatures as compared to other films, as polyethylene. Conventional heat sealing methods do not produce effective seals on superimposed sheets of this film. The seals are incomplete or, if complete, have a low seal strength. High energy microwave sealing techniques have been used to improve the seal strength of polyester films. Thse techniques process the film at a relatively slow rate of speed.

SUMMARY OF INVENTION

The invention is directed to an apparatus and method of flame sealing heat-sealable sheet materials that have relatively high melting points. Examples of the sheet material are polyester films, polypropylene films, aluminum foils and like films and metal foils. The apparatus has a folder that center folds a single sheet stored on a roll. The folded sheet is continuously moved under tension in an elongated path by a puller unit. During movement in the elongated path, adjacent outer portions of the folded sheet are trimmed with a knife means to form aligned edges. The knife means can have a moving circular face that mechanically joins the edges together. An elongated flame unit applies a linear flame to the cut edges to flame seal the edges together. Heat is confined to the edges with an elongated cooling means located adjacent and generally parallel to the elongated flame unit. A cooling unit having an elongated cooling chamber accommodates the hot flame sealed edges. The forming of the edges, flame sealing the edges and cooling the hot sealed edges are all accomplished with the folded sheet material moving in the elongated path and under substantially constant tension. A brake assembly cooperating with the roll functions to maintain substantially constant tension on the film as it moves through the apparatus.

IN THE DRAWINGS

FIG 1. is a top plan view of the apparatus for flame sealing sheet material of the invention;

FIG. 4 is an enlarged sectional view taken along the line 4—4 of FIG. 1;

FIG. 5 is an enlarged sectional view taken along the line 5—5 of FIG. 1;

FIG. 6 is a sectional view taken along line 6—6 of FIG. 5;

FIG. 7 is an enlarged sectional view of the edge of the sheet material formed by the trimmer knife;

FIG. 8 is an enlarged sectional view taken along the line 8—8 of FIG. 1;

FIG. 13 is an enlarged sectional view taken along the line 13—13 of FIG. 1;

FIG. 14 is an enlarged sectional view taken along the line 14—14 of FIG. 13; and FIG. 15 is an enlarged sectional view taken along the line 15—15 of FIG. 13.

Figure 1:
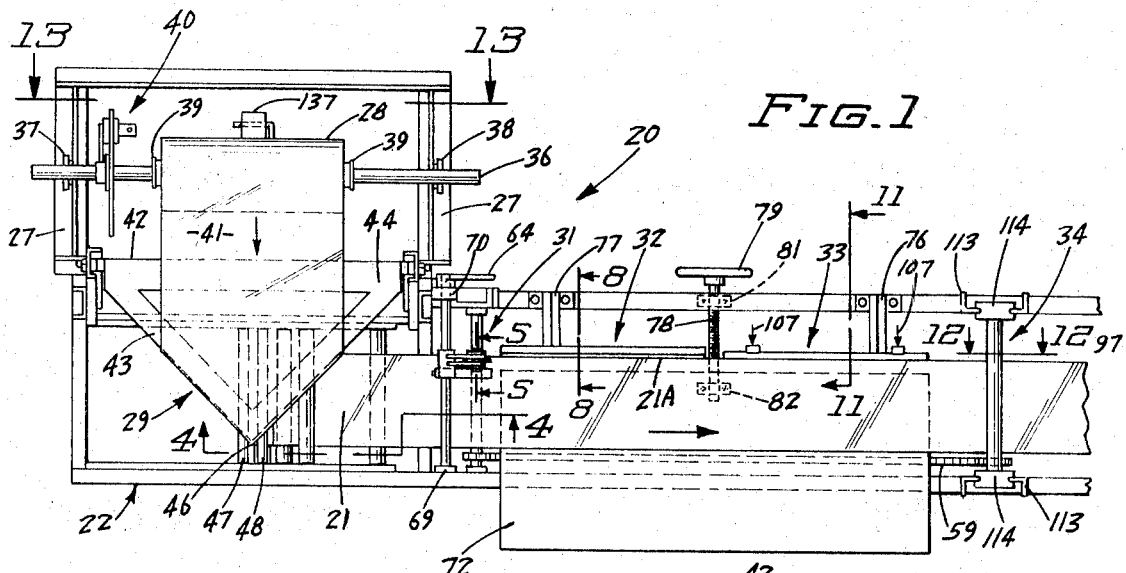
Figure 2:
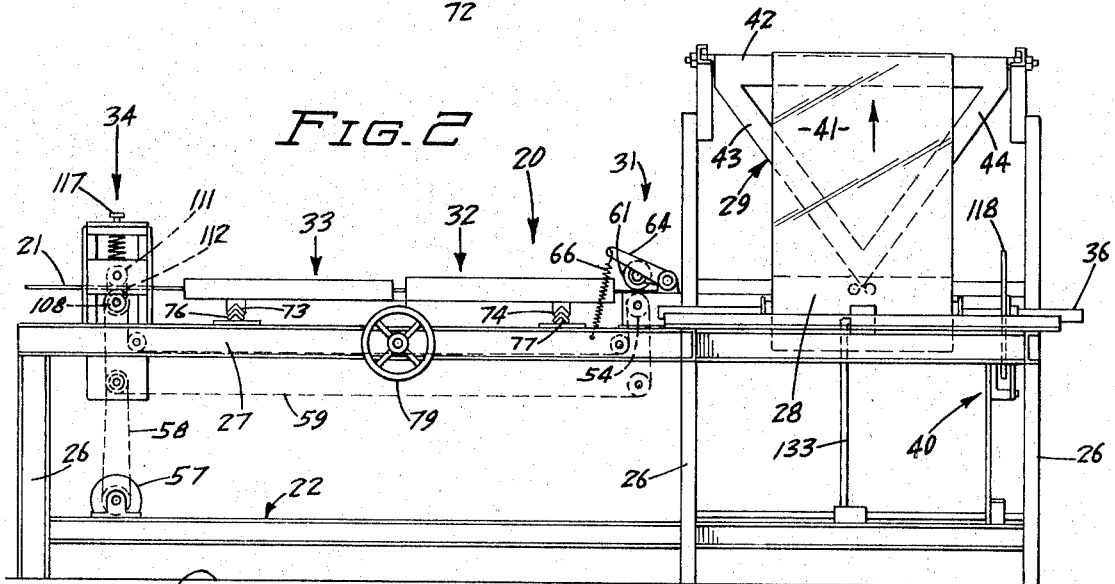
FIG. 2 is a side elevational view of the top side of the apparatus of FIG. 1.
Figure 3:
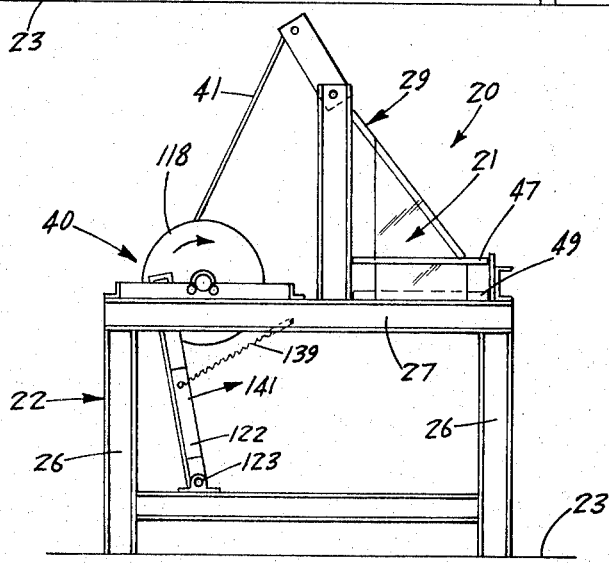
FIG. 3 is an end elevational view of the right end of FIG. 2.

Referring to the drawings, there is shown in FIGS. 1-3 the flame sealing apparatus of the invention, indicated generally at 20, for continuously flame sealing superimposed edges of heat-sealable sheet material. The heat-sealable material is a plastic film center folded into two superimposed layers which are heat sealed at their free edges to form a tube. The sheet material is a polyester film or like plastic film materials. The sheet material can be aluminum foil or like metal foils. Polyester films, as 3M Company's "Scotchpak" film, have relatively high melting points and are stable through normal oven bake cycles. They are usable for roast-in-bag and bake-in-bag packages. These films are oriented, transparent, chemical and moisture resistant and flexible at extreme temperatures. The uses of this type of film have been limited because it cannot be sealed readily by heat or high frequency methods. The apparatus and method herein disclosed is an effective and economical process of flame sealing polyester film.

Apparatus 20 has a genrally L-shaped frame, indicated generally at 22, supported on a floor 23. The frame 22 has a plurality of upright legs or posts 26 secured to horizontal members 27 providing the support structure for the parts of the apparatus.

The heat-sealable sheet material is taken in flat sheet form from a supply roll 28. The flat sheet 41 moves from the supply roll 28 over a folder 29 operable to center fold the flat sheet 41 into superimposed relationship. The folded sheet 21 moves under a trimmer assembly, indicated generally at 31, to trim and form aligned edges 21A and 21B of the sheet 21 and to compress and mechanically join the continuous edges together. The folded sheet 21 moves from the trimmer assembly 31 to a longitudinal flame sealer unit, indicated generally at 32, which functions to flame seal the trimmed edges 21A and 21B together. The sealed edges form a bead 97 which moves through a longitudinal cooler unit 33. A film pulling assembly 34, located rearwardly of the cooler unit 33, functions to continuously move the film through the apparatus and maintain the film under a substantially constant tension as it moves in an elongated path through the trimmer assembly 31, the flame sealer unit 32 and cooler unit 33.

The supply roll 28 is carried on an elongated shaft 36. Opposite ends of the shaft 36 are supported on pairs of rollers 37 and 38 rotatably mounted on horizontal frame members 27. The roll 28 is removably mounted on the shaft and rotatably therewith with suitable mounting means, as collars or plugs 39. A retarding force is placed on the shaft 36 with a brake assembly, indicated generally at 40, operable to maintain a substantially constant tension on the film as it unwinds from the supply roll 28. Details of the brake assembly and its controls are shown in FIGS. 13-15 of the drawings.

The film on roll 28 is unrolled as a single flat sheet 41. This flat sheet 41 moves upwardly over a transverse bar 42 to elevate the sheet to the top of the folder 29.

Folder 29 has a pair of downwardly converging members 43 and 44 which have outer edges terminating at a point 46 substantially at the longitudinal center line of the sheet 41. As the sheet 41 moves downwardly over the fold members 43 and 44, the sheet is folded approximately in half, having an upper layer and a lower layer located in a superimposed position, forming folded sheet 21.

From the folder 29, the folded sheet 21 moves between a pair of transverse guide rollers 47 and 48 and around spaced rollers 49, 51 and 52. From roller 52 the folded sheet 21 moves up and over positioning roller 53 which aligns the sheet 21 with the top of a table 72.

Referring to FIGS. 4, 5 and 6, the trimmer assembly 31 comprises a bottom roller 54 located below the folded sheet 21. A transverse shaft 56, rotatably mounted on suitable bearings secured to the frame, is secured to the roller to position the roller under the folded sheet 21. As shown in FIG. 2, motor 57 through endless chain drives 58 and 59 drives the roller 54 in the direction of movement of the folded sheet 21. The roller 54 is driven at approximately the same speed of linear movement as the folded sheet 21 in its elongated path. Located above the roller 54 is a knife or cutter wheel 61. The cutter wheel 61 is rotatably mounted on an arm 62 for rotation about an axis substantially parallel to the longitudinal axis of the shaft 56. The inner end of the arm 62 is secured to a sleeve 62A fixed to a transverse shaft 63. A forwardly directed lever arm 64 is attahced to one end of shaft 63. A spring 66 connected to the outer end of the lever arm 64 and the frame 27 biases the arm 62 and the cutter wheel 61 into engagement with the outer peripheral surface of the roller 54. A generally flat, spring biased finger 67 located adjacent the side of the cutter wheel 61 holds the folded sheet 21 in engagement with the roller 54. The finger 67 is attached to a block 68 mounted on the sleeve 62A. Opposite outer end sections of the shaft 63 are located in bearings 69 and 70, shown in FIG. 1, secured to the frame 22.

Cutter wheel 61 has a rounded outer peripheral face 71. As shown in FIG. 7, when viewed in cross section, the face 71 has a relatively large radius of curvature with a relatively smooth outside surface. The face 71 functions to cut the sheet 21, forming aligned linear edges 21A and 21B, and compress the edges 21A and 21B together to mechanically join the sheet 21 together by compressive force. The edges 21A and 21B are under tension as they are being formed by the wheel 61 and joined together by wheel 61 riding on roller 54.

The folded sheet can be trimmed with a sharp knife having a cutting edge projected downwardly into a circumferential recess in roller 54. The cutting edge of the knife must be kept sharp to produce a clean and continuous cut.

As shown in FIG. 1, positioned adjacent the trimmer assembly 31 is an elongated table 72 having a generally flat top surface for supporting the folded sheet 21. The table 72 is mounted on a pair of cross inverted V-shaped members 73 and 74 so that it can be laterally positioned relative to the folded sheet 21. The cross members 73 and 74 are supported on transverse guide rails 76 and 77 mounted on the frame 22. The table 72 is laterally moved by use of a transverse screw 78. Wheel 79, mounted on the end of screw 78, is used to rotate the screw 78 and thereby laterally position the table 72 relative to the frame and sheet 21. The screw 78 is secured to the frame with a suitable bearing 81 and is threaded into a nut 82 secured to the table 72.

Figure 9:
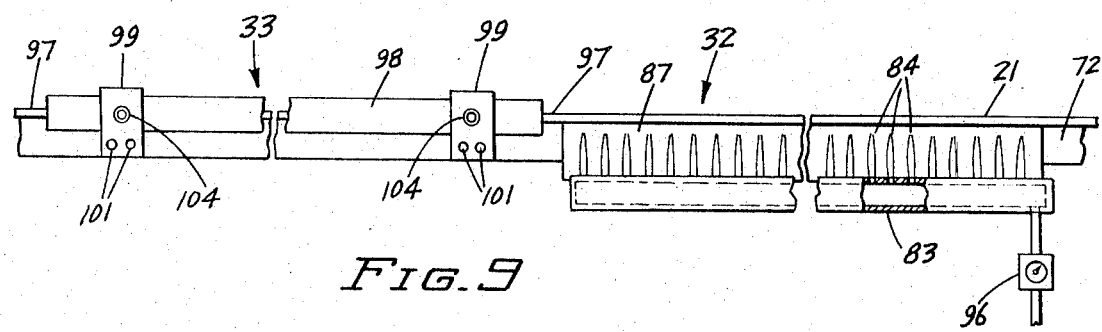
FIG. 9 is a sectional view taken along the line 9—9 of FIG. 8.
Figure 10:
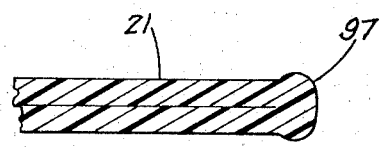
FIG. 10 is an enlarged sectional view of the flame sealed edge.

The flame sealer unit 32 shown in FIGS. 8 and 9 has a longitudinal gas burner 83 having a plurality of longitudinally aligned, spaced, upwardly directed openings for the discharge of gas to establish the plurality of flames 84. For example, burner 83 is an elongated cylindrical member 26 inches long having holes along the top side thereof spaced approximately one-fourth inch apart. The intensity of the flames 84 is regulated with a regulator valve 96 so that the heating characteristics of the burner 83 can be controlled. The burner 83 is secured to the table 72 by a bracket 86 attached to table 72 and cross member 73. Located between burner 83 and adjacent edge of table 72 is an elongated housing 87. As shown FIG. 9, the housing 87 is longer than the burner 83. It has end portions that extend longitudinally beyond both ends of the burner. The housing 87 has a chamber 88 for carrying cooling fluid. The fluid in chamber 88 is circulated therein with a pump 89 connected to cooling coils 91. The cooling coils 91 can be part of the condeser of a refrigeration system. The housing has an elongated longitudinal flat top wall 87A co-extensive with the top surface of the table 72. The folded sheet 21 rides on the top wall so that a linear portion of the sheet is continuously cooled. The flames 84 are located adjacent the outside wall of housing 87 and extend upwardly to flame seal the compressed edges 21A and 21B together. Flames 84, being in longitudinal alignment, progressively form a bead 97 in sealing edges 21A and 21B. The flame sealing is done immediately adjacent the cooled longitudinal portion of the sheet so that the extent of the transfer of heat and the seal is limited. Also, the heat sealing is done while the film is under tension, thereby minimizing the shrinking and distorting effects on the sheet material caused by heating the edges. With the sheet 21 and its aligned edges 21A and 21B under tension, the molecular orientation of the heated edges has a minimum of change so that the flame sealed edge forming the linear bead 97 has considerable strength after it is cooled.

Located outwardly of the burner 83 is an upwardly directed longitudinal shield 92. Shield 92 is secured to ears 93 with nut and bolt assemblies 94. The burner 83 and shield 92, being secured to cross members 73 and 74, move laterally with the table 72. This lateral movement of the table positions the amount of edge of the sheet that extends laterally outward of the cooling housing 87. Thus, the position of edges 21A and 21B relative to the flames 84 can be regulated by changing the lateral position of the flames 84 relative to the sheet 21.

Figure 11:
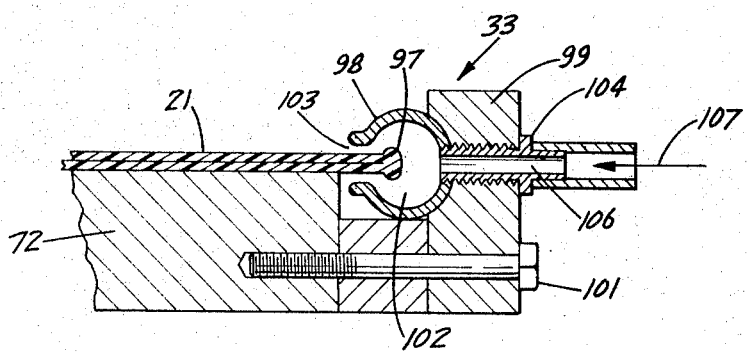
FIG. 11 is an enlarged sectional view taken along the line 11—11 of FIG. 1.

The cooling unit 33 is located in general longitudinal alignment with the flame sealer 32 and functions to cool the bead 97 under tension. The cooling unit 33 has a longitudinal horizontal member 98 mounted on a pair of upright supports 99. Bolts 101 mount the supports 99 to the table 72, as shown in FIG. 11. The longitudinal member 98 has an elongated linear chamber 102 and a longitudinal slot 103 facing the top edge of the table 72. The slot 103 is of a size to receive the sealed edges of the sheet 21. Each support 99 has a nipple 104 attached to the longitudinal member 98. Each nipple 104 has a passage 106 for carrying cooling air, as indicated by arrow 107, to the chamber 102. The amount of air supplied to the chamber 102 can be regulated with a conventional valve (not shown), thereby controlling the cooling effect of the air on the bead 97.

Figure 12:
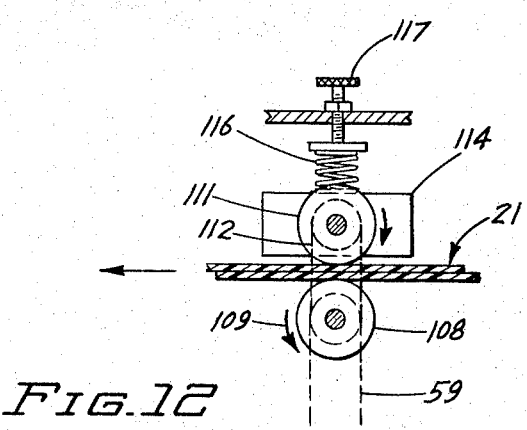
FIG. 12 is an enlarged sectional view taken along the line 12—12 of FIG. 1.

The sheet material puller 34 is located in linear alignment and rearward of the cooling unit 33. The puller 34, shown in FIGS. 1, 2 and 12, has a transverse bottom drive roller 108 that is driven in the direction of the arrow 109 by the motor 57 via the endless drives 58 and 59. Located in transverse alignment with the bottom roller 108 is a top drive roller 111 which is driven by an endless drive 112 at the same rate of speed as the bottom roller 108. The opposite ends of the top roller 111 are located adjacent upright guides 113 and rotatably mounted in blocks 114. The blocks 114 are slidably mounted in the upright guides and are biased in a downward direction by springs 116. An adjustment bolt assembly 117 is operative to alter the tension of the springs 116, thereby increasing the biasing force on the transverse top drive roller 111. The rollers 108 and 111 engage opposite sides of folded sheet 21 and provide even pulling force transversely across the sheet material. The pulling force places the sheet under tension as the brake assembly 40 maintains a substantially constant tension on the supply roll 28. The tension is also achieved by the friction of the sheet as it moves over the folder 29 and through the curved path around the rollers 49, 51 and 52, shown in FIG. 4

The tension on sheet 21 is maintained substantially constant during movement of the sheet in an elongated path wherein the material edge is trimmed, flame sealed and cooled. The brake assembly 40, shown in FIGS. 13, 14 and 15, functions to maintain substantially constant tension on the sheet 21 as it unrolls from the supply roll 28. Brake assembly 40 comprises a flat disc or rotor 118 mounted on the shaft 36 for rotation therewith. Disc 118 is located adjacent one side of the frame 22 so that the brake assembly does not interfere with the supply roll 28. A stationary member, or stator, 119 cooperates with the disc 118 to provide a friction force on the disc thus retarding rotation of the disc 118 and shaft 36. The stator 119 comprises a yoke 121 positioned about a portion of the disc 118. The yoke 121 is attached to a downwardly extended arm 122. The lower end of the arm 122 is mounted on block 125 secured to a transverse shaft or rod 123. Opposite ends of the rod 123 are located in bearings 124 and 126 mounted on the lower horizontal frame members 27. Mounted on one yoke portion of the U-member 121 is a first fixed friction pad 127. Located on the opposite side of disc 118 is a second movable friction pad 128. The pad 128 is attached to a movable portion of a fluid motor or pneumatic cylinder 129. The cylinder 129 is mounted on a top portion of the yoke 121. The pneumatic cylinder is connected to an air line 131 having a pressure regulating valve 132. Valve 132 is adjustable to vary the pressure of air supplied to motor 129, thereby controlling the friction or braking force supplied to the disc 118 by friction pads 127 and 128.

Located adjacent the center portion of the rod 123 is an upwardly directed arm 133. The lower end of arm 133 is secured to transverse sleeve 134 accommodating and secured to a mid-portion of the rod 123. The upper end of arm 133 has a turned end 136 positioned generally parallel to the rod 123. A cylindrical roller 137 is rotatably mounted on the end 136 and held thereon with a suitable fastener 138, as a cotter key or snap ring. The roller 137 is biased into engagement with the outer portion of the supply roll 28 in general horizontal alignment with the shaft 136. A spring 139 attached to the mid-portion of the brake arm 122 and frame 27, shown in FIGS. 13 and 14, biases the arm 122 in the direction of arrow 141. With the arm 122 being secured to the transverse rod 123, the biasing force is transmitted to the control arm 133 biasing it in the direction of arrow 141. As the supply of sheet material from roll 28 decreases, the brake assembly 40 will move inwardly toward the axis of rotation of the disc 118, thereby reducing the torque arm of the brake in conjunction with a reduction in the torque arm of the sheet material 41 being removed from roll 28. The torque arms reduce proportionately together, whereby the tension on the folded sheet material 21 as it moves through the machine remains substantially constant. For example, the tension on the sheet material 21 as it moves in the elongated path is two to three pounds per transverse inch of sheet material. The amount of tension on the sheet material can be adjusted through use of regulating valve 132 which supplies air under pressure to the pneumatic cylinder 129.

In use, the sheet material is initially placed in supply roll form on the shaft 36 with the roller 37 for controlling the torque arm of the brake in engagement with the outer peripheral portion of the roll 28. The film is unrolled from supply roll 28 and passes upward over the folder 29. As the film moves through the folder, it is folded in half, forming a bottom layer and a top layer indicated at 21 as a folded sheet. The folded sheet moves in a linear direction along an elongated path generally normal to the flow of sheet material through the folder over the table 72.

The trimmer 31 functions to form linear aligned edges along side-by-side portions of the sheet by compressing and cutting the sheet as it moves in the elongated path. The cutter wheel or score knife 61 is biased into engagement with a driven roller 54 to mechanically press and cut the edge of the sheet to form the aligned edges 21A and 21B. As shown in FIG. 7, the edges 21A and 21B of the sheet material are mechanically compressed and reduced in thickness. The wheel 61 has a rounded outer peripheral face 71 which produces the wedging compressing forces on the sheet.

The folded sheet continuously moves through the cutter and into an elongated flame means. The flame means is located in general longitudinal alignment with the edges 21A and 21B and functions to heat a substantial length of the linear edge as it moves in an elongated path. The flame means is a series of longitudinally aligned gas flames 84 resulting from the burning of combustible gas, as natural gas or the like. The temperature of the flames is about 700° to 900°. Other temperatures can be used depending on the material to be flame sealed. The linear length of the flame burner 83 can vary depending on the speed of movement of the sheet material relative to the sealing flames. In general, the faster the movement of the sheet material, the longer the burner. The flames 54 seal the compressed portion of the edge into a bead by melting and fusing the edges, thereby joining the edges. During heating of the edges, a linear longitudinal portion of the sheet adjacent the edges 21A and 21B is cooled by the elongated longitudinal housing 87. The linear portion of the sheet is cooled prior to flame sealing the edges and after flame sealing. For example, the temperature of the cooling fluid in chamber 88 of housing 87 is maintained at about between 45° to 85°. The cooling fluid can have colder temperatures if needed to control the temperature of the sheet material. The cooling fluid in chamber 88 can be cold tap water connected to a water supply. This source of cooling fluid would replace the pump 89 and cooling coils 91. During the entire flame sealing operation, the sheet is under constant tension and moves continuously relative to the flame. The position of the flame relative to the edge is laterally adjustable by movement of the table 72 on the supporting members 76 and 77. The table is movable by turning adjusting screw 78 with the wheel 79. In this manner, the amount of edges 21A and 21B subjected to the flame can be regulated whereby the size of the flame seal can be varied.

The flame sealed edge is then moved through the cooling unit 33. Cooling air 107 is directed into the elongated chamber of the cooling unit 33 and functions to cool the edge while it is under tension and moving. The cooling air 107 can be at room temperature.

The folded sheet material 21 is moved in an elongated path over table 72 by puller unit 34. The sheet material is moved between the top and bottom drive rollers 108 and 111 which continuously move the sheet material through the apparatus. The motor 57 functions via endless drives 58 and 59 to drive the top and bottom rollers 108 and 111 as well as the roller 54 located below the cutter wheel 61. The roller 54 is driven at subtantially the same rate of speed as rollers 108 and 111 and has a minimum of interference with movement of the sheet material in the elongated path. The speed of the motor 57 and/or its drive mechanism can be changed to vary the speed of movement of the sheet material.

The sheet 21 leaves the puller unit 34 in tubular form. It can then be wound on a roll or delivered to another processing machine, as a cutting and folding machine.

It is apparent that many modifications and variations of the apparatus and method herein set forth may be made without departing from the spirit and scope of the invention. The specific apparatus and method described are given by way of example only and the invention is limited only by the terms of the appended claims.

The embodiments of the invention in which an exclusive properly or privilege is claimed are defined as follows:

1. A method of sealing together adjacent longitudinal portions of heat-sealable sheet material comprising: continuously moving the sheet material and longitudinal portions thereof in an elongated path determined by the longitudinal length of the sheet material, subjecting the sheet material to substantially constant tension along the longitudinal length of the sheet material as the sheet material continuously moves in the elongated path, forming linear aligned longitudinal edges along adjacent longitudinal portions of the sheet material as the sheet material moves along the elongated path, said longitudinal edges being extended along the elongated path of movement of the sheet material, applying an elongated flame to a substantial length of said linear edges to longitudinally seal during movement of said sheet material along the elongated path, said flame being extended along the elongated path of movement of the sheet material, cooling a linear longitudinal portion of said linear seal as the seal moves away from said flame in said elongated path.

2. The method of claim 1 wherein: said sheet material is pulled in said elongated path.

3. The method of claim 1 wherein: the linear edges are joined by mechanical force during the formation thereof.

4. The method of claim 1 wherein: the elongated flame provides a substantially constant source of heat along a substantial linear longitudinal length of said linear aligned edges.

5. The method of claim 1 wherein: an elongated longitudinal portion of the sheet material longer than the elongated flame is cooled adjacent the linear aligned edges that are being heat sealed together.

6. The method of claim 1 including: longitudinally folding the sheet material to place opposite portions thereof in side-by-side relation to each other, said folded sheet material being move in the elongated path.

7. The method of claim 6 wherein: the opposite portions of the folded sheet material are subjected to substantially the same pulling forces to move the sheet material in the elongated path.

8. The method of claim 1 wherein: the linear aligned edges are formed by linearly cutting the adjacent portions of the sheet material.

9. The method of claim 1 wherein: the linear aligned edges are formed by linearly compressing and cutting adjacent portions of the sheet material.

10. The method of claim 1 wherein: the sheet material is subjected to a substantially constant tension by braking movement of the sheet material adjacent the beginning of the elongated path and pulling the sheet material adjacent the end of the elongated path to overcome the braking force acting on the sheet material.

11. A method of sealing together adjacent longitudinal edge portions of superimposed layers of heat-sealable sheet material comprising: continuously moving the sheet material and adjacent longitudinal edge portions thereof in an elongated path determined by the longitudinal length of the sheet material, subjecting the sheet material to substantially constant tension along the longitudinal length of the sheet material as the sheet material continuously moves in the elongated path, applying an elongated flame extended in the direction of movement of the sheet material to a substantial length of the longitudinal edge portion to longitudinally heat seal said edge portions together to form a linear longitudinal seal during movement of said sheet material and edge portions along the elongated path, and cooling a linear portion of said sheet material adjacent said longitudinal edge portions being heat sealed together by said elongated flame.

12. The method of claim 11 wherein: said sheet material is pulled in said elongated path.

13. The method of claim 11 including: forming linear longitudinal edges on the edge portions by mechanical means before the application of the flame thereto.

14. The method of claim 11 wherein: the elongated flame provides a substantially constant source of heat along a substantial linear longitudinal length of said linear aligned edges.

15. The method of claim 11 wherein: an elongated longitudinal portion of the sheet material which is longer than the elongated flame is cooled adjacent the linear aligned edges that are being heat sealed together.

16. The method of claim 11 including: cooling a linear longitudinal poriton of said linear seal as the seal moves away from said flame in said elongated path.

17. The method of claim 11 wherein: opposite portions of the superimposed layers of sheet material are subjected to substantially the same pulling forces to move the sheet material in the elongated path.

18. The method of claim 11 wherein: linear aligned edges are formed on the longitudinal edge portions by linearly cutting the sheet material before the application of flame thereto.

19. The method of claim 11 wherein: linear aligned edges are formed on the longitudinal edge portions by linearly compressing and cutting the sheet material before the application of flame thereto.

20. The method of claim 11 wherein: the sheet material is subjected to a substantially constant tension by braking movement of the sheet material adjacent the beginning of the elongated path and pulling the sheet material adjacent the end of the elongated path to overcome the braking force acting on the sheet material.

* * * * *